United States Patent [19]
Van Den Berghe

[11] Patent Number: 5,102,677
[45] Date of Patent: Apr. 7, 1992

[54] APPARATUS AND METHOD FOR PRODUCING CRACKERS OF GRANULAR MATERIAL

[76] Inventor: René Van Den Berghe, Baneike 24, B-9660 Brakel, Belgium

[21] Appl. No.: 415,293

[22] PCT Filed: Feb. 22, 1988

[86] PCT No.: PCT/BE88/00005
§ 371 Date: Sep. 5, 1989
§ 102(e) Date: Sep. 5, 1989

[87] PCT Pub. No.: WO88/06425
PCT Pub. Date: Sep. 7, 1988

[30] Foreign Application Priority Data

Feb. 25, 1987 [BE] Belgium .................. 8700173

[51] Int. Cl.⁵ .................. A23L 1/00; A47J 37/00
[52] U.S. Cl. .................. 426/446; 99/349; 99/372; 99/439; 99/323.4; 425/261; 426/523
[58] Field of Search .............. 425/4 R, 256, 261, 447, 425/159, 157, 150; 99/323.4, 349, 353, 326, 331, 372, 439; 426/446, 512, 523

[56] References Cited
U.S. PATENT DOCUMENTS 3,949,660  4/1976  Kuhlman .................. 99/352
4,281,593  8/1981  Jevaert .................. 99/323.4
4,328,741  5/1982  Yoshikazu .................. 99/332
4,365,547  12/1982  McClure .................. 425/339
4,909,719  3/1990  Bielfeldt .................. 425/406

FOREIGN PATENT DOCUMENTS 0006575  1/1980  European Pat. Off. .
0241972  3/1987  European Pat. Off. .
1443199  7/1976  United Kingdom .

Primary Examiner—George Yeung
Attorney, Agent, or Firm—Shlesinger, Arkwright, Garvey

[57] ABSTRACT

Apparatus and method for producing shaped products from granular materials, in particular food products from cereals such as rice, corn, wheat or the like, which are pressure-baked and afterwards expanded in a heatable mold defined in a fixed upper mold and a movable lower mold (punch). Preferably the mold comprises a peripheral mold element which is individually movable. Driving means are provided for actuating the movable punch which are in the form of two aligned, separately controlled hydraulic cylinders of which one cylinder defines a precise expansion and the other cylinder controls the compression in combination with separate end switch means.

24 Claims, 8 Drawing Sheets 3.0

3.1

3.2

3.3

3.4

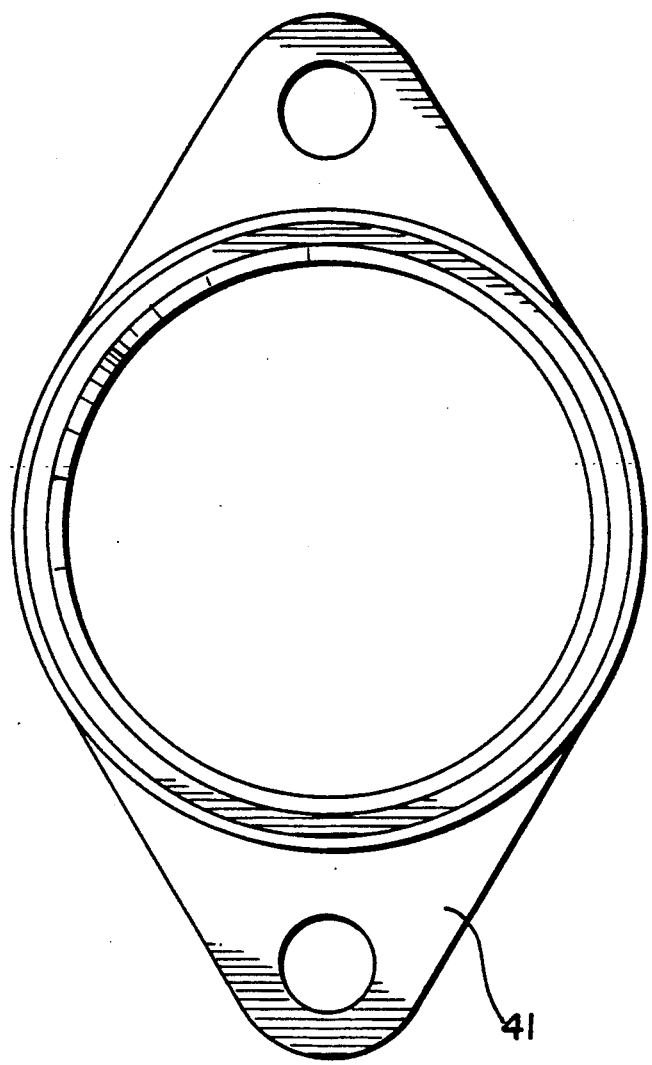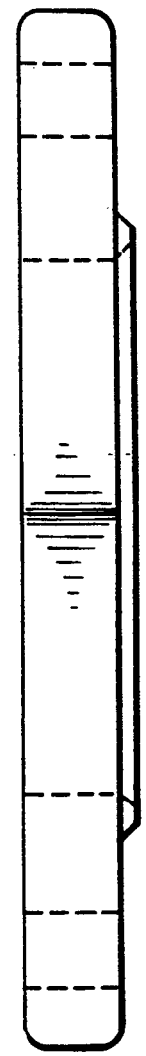
FIG. 14  FIG.15
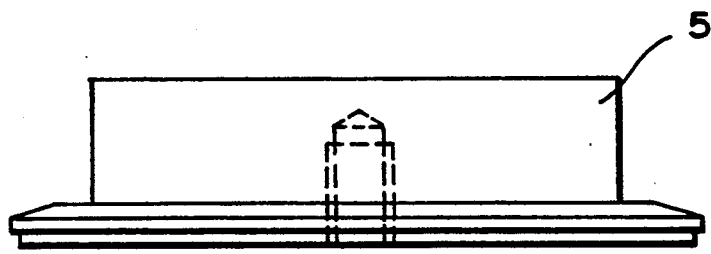
FIG. 16

APPARATUS AND METHOD FOR PRODUCING CRACKERS OF GRANULAR MATERIAL

The present invention relates to the production of food products from granular raw materials such as the cereals rice, corn, wheat, barley, oats, soybean or the like and mixtures thereof, optionally mixed with crushed grain material, which are formed into crackers, cakes or the like forms.

More in particular the invention relates to an apparatus for carrying out a method of producing a cracker from cereals which are pressure-baked in a heated mold and afterwards expanded.

In the known method for producing this type of food a granular raw material, for instance rice, is fed into a heated and airtight chamber defined in upper and lower baking molds, compressed and heated therein by vertical movement of one or both of said baking molds which slidably enter into each other, thereby closing the mold and exerting a pressure on the grain material in the mold chamber for a predetermined lapse of time. Thereafter the upper or lower baking mold is vertically moved to remove the compression whereby the mold cavity is still closed. As a result, the compressed raw material is caused to expand instantaneously to form a cracker of a desired form in a self-sustaining structure, subsequently the cracker is removed from the mold cavity by opening the baking molds and actuating suitable discharge means, whereupon the production cycle starts again.

In the hitherto known apparatuses for the production of pressure-baked and expanded crackers according to a method set forth above, the upper mold is usually designed as a fixed, hollow die adapted to be heated by an electrical heater whereby the mold cavity is open ended at the bottom side of the die, i.e. directed downwardly. Disposed below and in opposition to the upper mold is a lower baking mold cooperating with said upper mold, designed as a punch adapted to be moved upwardly and downwardly relative to the fixed die and slidably received within the mold cavity of the die in an air-tight manner at a time when the punch is moved upwardly.

The vertical reciprocal sliding movement of the punch into and out of the mold cavity is performed by actuation of suitable driving means connected to the punch, for example an air cylinder, a driven rotary cam plate, a jack and the like. The apparatus is further equipped with a feeding device for introducing granular material between the upper and lower baking molds, and is usually in the form of a slidable dosimeter or feeding plate with a quantative hole or holes for transporting a predetermined quantity of cereals (contained in a charging hopper positioned above said feeding plate) onto the surface of the punch which is then in its lower (drawn back) feeding position below the die cavity.

Known apparatuses of the type with fixed upper die and cooperating lower movable punch, when compared to other mold configurations, are advantageous in that only one mole plate needs a drive and control system and that the obtained product is easily discharged since it is removed out of the mold cavity simply by gravity when the punch is moved back to its lower feeding position.

Notwithstanding this, a number of important drawbacks are still observed in the practise of using such apparatuses for the production of crackers. These are associated inter alia with certain insufficiencies of the drive system and the baking mold and with inconsistences in the expansion control, which generally lead to a limited productivity level, inconsistent product quality and cause frequent mechanical troubles. Furthermore the high noise level and elevated energy consumption of existing pressure-baking units is a serious disadvantage in mass production.

Employment of pneumatic drives is energy consuming and has the disadvantage that even a slight change of air quantity fed from an installed compressor (which requires high-power supply) to an air-cylinder delicately changes the movement of the driven punch, and as a result the thickness of the expanded crackers cannot be made uniformly. An apparatus of the kind with pneumatically driven baking molds is known from BE-A-902360 (Belgian patent) and U.S. Pat. No. 4,328,741 (U.S. patent). In the latter case both upper and lower molds are actuated.

The use of rotary cam plate drive elements with push rods to actuate the baking mole(s) is described in BE-A-799316 and GB-A-2165437. The latter British patent document refers to three driven cam plates for respectively upper and lower baking molds and for the feeding device. Such complicated mechanical systems necessitate a precision-finishing of the cam plate perifery and besides of being noisy, are difficult to regulate and to adjust according to desired changed in product requirements. Moreover, frictional and impact wear of the cam surface (which is inevitable given to high-mechanical loads), even to a slight extent, will unavoidably lead to changes in the movement of the baking molds and hence cause the apparatus oft to run out of the product specification.

A second point of concern relates to the performance and control of the required expansion subsequent to the compression of the grain material. According to a prior art system described in Europ. Patent EP-A-006575, there is provided a separately actuated and distinct stop means for temporarily retaining the punch in an expansion position, when the jack that drives the punch is drawn back after the compression cycle. This combination of two separately actuated stop and drive members is cumbersome and expensive, and furthermore prove to mechanical damage due to high impact loads occuring between stop means and punch shaft.

A recent improvement of the former apparatus which likewise utilizes a baking mold consisting of a fixed, hollow upper die and a lower movable punch, is disclosed in European Patent Appl. EP-A-0241972. In said improved apparatus a drive member, i.e. a twoarm hinge-joint actuated by a jack, is raised into a locked position when the punch, connected therewith, has attained its upper position wherein the granular material is compressed in the mold chamber. The expansion of the compressed material is realized by first unlocking the drive member with the help of a spring assisted unlocking means fixed onto the operative rod of the jack when the latter is moved back, and then stopping the explosively released punch with punch-driving member by means of an abutment of said operative rod. This arrangement, however, has the disadvantage that a predetermined thickness of the expanded product is difficult to maintain because the unlocking point fluctuates.

Furthermore the unlocking step itself requires an extra power supply to the jack and gives rise to undesirable peak loads and a comparatively elevated noise level.

In addition to the above-mentioned drawbacks of conventional apparatuses in the preparation of pressure-baked and subsequently expanded food products, an important deficiency, generally associated with the use of a mold system consisting of a fixed hollow upper mold and a movable lower baking mold, is unforeseeable sticking of the baked product to the mold. Normally the expanded cake cracker should leave the mold with the punch on which it is carried, when the latter is moved backwards to its lower feeding position in which discharge member removes the cake from the punch and a feeding device then introduces a new mass or grains onto the punch head. However, it frequently happens that the whole cracker unexpectly keeps sticking in the upper mold cavity, for reasons not yet fully explained. In some cases parts of the cracker remain in the edges of the mold so that the released cracker shows a deficient rim. When said sticking occurs to a more or less severe degree, the next cracker cycles will always give rise to spoiled products since the former product (or parts of it) left behind in the mold, gets overheated or burnt and badly affects structure and form of the following cakes. In addition the partly carbonized rests may strongly adhere to the mold and even degrade the mold surface. It is clear that the machine has to be stopped as quickly as possible when this happens to avoid a waste of material and apparatus damage or deregulation. Given the duration of time needed for cleaning the mold before restarting the apparatus, it can be seen that sticking leads to poor productivity and production economics and further causes increased maintenance and labor costs. Considering that this unfavorable situation may already occur in the production of current rice cakes of normal thickness (which usually have the least tendency to sticking), it is easy to understand that unsurmountable problems will often arise when producing thinner cakes and/or cakes from granular mixtures other than rice. This means that existing apparatus mostly is not suitable for producing a wide variety of cracker compositions and thicknesses.

The present invention seeks to overcome the cracker production problems encountered with known pressure-baking techniques.

In view of the above-cited prior art, a main object underlying the invention is to provide an apparatus and a method for producing cakes or crackers from granular raw materials, which can out-perform any available from other known cracker production apparatuses and processes. In this context, out-performance means in terms of reliability productivity, consistency of product quality and range of feasable product compositions.

According to one aspect of the invention there is provided an apparatus for the manufacture of products of desired composition and shape from granular raw materials, in particular food products from cereals such as rice, wheat, corn or the like and/or mixtures thereof which are pressure-baked and subsequently expanded, the apparatus comprising:
   (a) a baking mold comprising a fixed upper mold element having a mold cavity defined therein by a fixed upper mold plate adapted to be electrically heated and to be adjusted in a desire vertical position and by a periferal wall element which either forms an integral solid part of said upper mold element or is in the form of a distinct ring adapted to be tightly pressed against the bottom side of said fixed upper mold plate, and a lower heatable mold element, adapted to be moved upwards and downwards relative to said upper mold element between a bottom position in which it is spaced below the upper mold element whereby the baking mold is then open for feeding the granular material, and a lifted position in which it is received within the upper mold element in a fluid-tight manner and is raised to a top position on which it compresses the fed granular material.
   (b) feeding means comprised of a supply hopper for the granular raw material and a dosimeter plate slidable between a first position in which it is below the hopper in order to receive the granular material and a second position above the lower mold element for feeding a predetermined quantity of said raw material onto said lower mold in its bottom position, the slidable dosimeter arranged to push off a self-sustaining cake of the lower mold element in its bottom position as the dosimeter moves back from its first position to its second position.
   (c) means controlling the motion of said dosimeter, means for controlling baking mold temperature and baking time.
   (d) drive and control means for controlling the selective upward and downward movement of the lower driven mold element in order to perform the following consecutive steps:
   (e) raising the lower mold element from its bottom to its top position and compressing and heating for a predetermined time said raw material within a hermetically closed chamber defined in said upper and lower mold elements, instantaneously expanding the pressure-baked material by moving back the lower element to a predetermined intermediate position within the mold cavity between said top and bottom position, whereby the baking mold is still closed, and temporarily holding the lower mold element on said intermediate position to enable a complete expansion of the compressed granular material, and finally moving back said lower mold element to its bottom position in which the obtained self-sustaining product is discharged and a new predetermined quantity of raw material is introduced so that the cycle can start again.

characterized in that the drive and control means controlling the selective up and down motion of the lower mold element according to aforesaid consecutive steps comprise an assembly of two cooperating hydraulic cylinders with adjustable displacement length of their double-action pistons, adapted to be individually and selectively actuated in a desired sequence for moving the drive shaft of said assembly in forward and backward direction, which shaft is so arranged as to drive the lower mold element either directly of through a transmission drive member connected with said mold element, further comprising a programmable control device monitoring the selective actuation sequence and desired displacement length of the working pistons of said cylinders, and a regulable end switch element disposed on said drive shaft or said transmission member assuring a consistently defined top position of the lifted lower mold element and further characterized in that the intermediate holding position into which the lower mold element is moved back after the compression step and temporarily retained there to allow full expansion of the compressed granular material, is provided by a stable drawn-back position of the hydraulic shaft which corresponds to a fixed position of the piston of one of the two hydraulic cylinders defined in the starting point of its displacement length.

According to a preferred embodiment of the present invention the lower mold element is a punch which is driven by a transmission drive member connected with the punch and with the hydraulically actuated shaft of the two-cylinder hydraulic drive system.

In this arrangement the transmission member is preferably in the form of a two-arm joint hinged together at one end, the unhinged end of one arm being swingably connected to the punch and the unhinged end of the other arm being swingably connected to a fixed shaft of the apparatus frame to be rotatable thereabout.

The operating shaft of the hydraulic drive can be connected to the transmission member either by a fixed connection or by a slidably arranged connection. In the latter case a preferable design of a slidably connection may comprise a block element fixed onto the two-arm joint, preferably located at the central part thereof where the two arms are hinged together and integrated therewith, said block element forming a central bushing through which the hydraulic drive shaft slidably enters and is extended over an appropriate length. At its entering side a pushing element is fixedly mounted onto said shaft, which element is pressed against the block of the slidable connection so that the two-arm joint is lifted towards its vertical position when the hydraulic drive moves in the forward direction. In the reverse direction the moved back drive shaft freely slides in said bushing so that the lifted transmission member may temporarily be left behind when the drive shaft is pulled back fast enough and provided the two arms of said member are nearly vertically aligned. Said nearly vertical alignment is controlled by a switch element disposed on the movable transmission member and adapted to cooperate with a corresponding micro-switch or contact element fixedly mounted on a suitable solid part of the apparatus frame. Within the context of said one-side freely slidable connection between the two-arm transmission member and the drive shaft, the adjustable switch element which interrupts the forward motion of the hydraulic drive, has the function of stopping the transmission-member in a desired lifted position which is finely regulable close to the vertical alignment of both arms, thereby allowing to achieve at wish a soft or a more explosive expansion.

The provision of aforesaid switch element also prevents that the two-arm joint is pushed past the vertical alignment of its fringed arms, in which case the transmission would get blocked in an undesirable locked position, or even worse, could be subject to permanent distortion or the like mechanical damage.

Similar advantages are applicable to the use of an end switch element in the case of a fixed connecting arrangement between transmission member and hydraulically driven shaft, with the distinction that said member must always instantaneously follow the returning shaft and hence, a slightly delayed "explosive" expansion will not be achievable.

A particular connective arrangement, which is operable both as a fixed and a slidable connection and which because of its increased robustness effectively protects the driven shaft against possible damage (thereby preventing expensive and time-consuming repair and replacement work of a delicate component forming an integral part of the hydraulic drive system), consists in encasing the end portion of the shaft with a tubular reinforcement element of appreciably larger diameter than said shaft and attached thereto by a screw joint tightened against the push-block off the shaft. This replaceable tubular casing, extending the shaft and sliding through a cooperating bushing of the two-arm transmission member, (which means it is subjected to frictional wear and bending loads instead of the shaft) may contain a screwable member to optionally fasten the casing on the bushing block and so quickly realize a fixed connection between the drive shaft and the transmission member.

In a preferred practice of the present invention, a particularly advantageous design of a hydraulic drive system suited to cooperate with a two-arm transmission member for controlling the motion of the lower mold, is constituted by two aligned hydraulic cylinders, fixed back-to-back as a one-piece solid assembly which is about horizontally arranged. In this arrangement the pistons of said hydraulic cylinders, actuated in sequence, move in opposite directions to cause a positive full displacement of the drive shaft of the assembly. Said drive shaft, connected at its one end to the transmission member, is an integral part of the hydraulic cylinder situated closest to said transmission member (and hence moves in the sense of its hydraulically actuated piston) and also supports the hydraulic drive assembly at this side. At the opposite side or end face of said assembly, i.e. where the other cylinder is located, there is provided a supporting rod having one end fixedly attached to said end face and another end swingably connected to a fixed shaft of the apparatus frame. In this way the at one side rotatably supported hydraulic drive unit can accomodate the small angular fluctuations emposed by the up and down movement of the two-arm joint. The hydraulic cylinder opposite to said swingable connection is adapted to move the hydraulic assembly as a whole in such a way that when its piston is displaced toward the right, the whole body of the hydraulic drive is pushed to the left. The required selective movements of transmission member and lower mold element are realized by the following consecutive steps and positions of the two hydraulic cylinders:

At the bottom (feeding) position of the lower mold element the drive shaft and transmission member are drawn back to the right, inclusive the piston acting directly on the drive shaft and transmission member which is then at the starting point of its stroke length close to the right end face of the left hand hydraulic cylinder. The piston of the right-hand cylinder is then adjusted at a predetermined point of its stroke length.

First the left hand cylinder is actuated and the piston moves from the right to the left until a preset end point. At the same time transmission member and lower mold are lifted upon completing the full stroke length of the left piston, the central control unit (programmed) instantaneously actuates the right hand cylinder whereby its piston is moved to the right and the transmission member and lower mold element are raised to their preset top position defined by the end switch element disposed onto said transmission member. Upon reaching said end position the displacement of the piston is automatically stopped without releasing the hydraulic pressure, and the granular material in the mold is compressed and heated for a predetermined time.

Thereafter the hydraulic pressure is released in the left hand cylinder and the hydraulic piston is quickly moved back to its initial position, so that the drive shaft is drawn back over a precise distance. As a result of this sudden pressure removal;, the lower mold element and transmission member cannot counteract the pressure exerted by the compressed and heated granular material which instantaneously expands, thereby throwing back the mold element and transmission member onto the pushing-block of the returned drive shaft whereby the lower mold element still remaining inside the mold cavity has slided back over a vertical distance corresponding to the expansion thickness, which is consistently uniform by being dictated by the stroke length of the left hand piston. This expansion position is maintained for a predetermined short time to obtain a fully expanded cake.

Thereafter the right-hand cylinder is actuated again and its piston is moved back to its initial position whereby the lower mold is moved back to its bottom position outside and below the mold. At this point the discharging and feeding mechanism is actuated whereby the expanded cake is removed from the lower mold head and a new predetermined quantity of grains is supplied onto said mold head.

It is easily understood that with a fixed connection between drive shaft and transmission member the backward movement of piston and shaft self-evidently implies simultaneous back sliding of the lower mold element so that there is no time delay between both displacements (which is well possible in case of a free sliding connection). In practice this means that with a fixed connecting arrangement a shock-like (more or less explosive) expansion is excluded.

It will be appreciated from the foregoing that the apparatus and method in accordance with the present invention contain important innovative key elements in particular the novel hydraulic drive arrangement and the end switch control, which in combination provide considerable advantages over the prior art systems in terms of mechanical stability, apparatus reliability, product quality and uniformity.

The apparatus according to the invention may additionally comprise the provision of means for decreasing and/or eliminating the problems associated with a variable degree of adherence between the expanded cake and the mold cavity. Since sticking may depend on a number of uncontrollable factors, it was hitherto impossible to overcome it with known cracker production apparatuses. Furthermore, most conventional apparatuses of the type with upper fixed hollow mold and movable lower mold are unusable for a large variety of grain materials and mixtures, and as a matter of fact limited to the production of predominantly rice cakes.

In a first improvement aspect of the present invention there is the provision of a pushing means in the upper mold element and separate operating means therefore adapted to push the expanded product out of the mold cavity at a time when the lower mold element is moved back from its intermediate expansion position within the baking mold to its bottom position outside and below the upper mold. Conveniently said pushing means is designed as a valvelike or piston-like element actuated by an air cylinder.

The body of the pushing element is disposed into a cavity (or seat) of similar form provided in the upper wall of the mold chamber and its stem passes through a perforation of said wall whereabove it is connected to appropriate actuating means, e.g. pneumatic actuator. When non-operated, i.e. during the pressure-baking of the grain material, the push-element is drawn back in its hollow seat and its external surface is even with the upper wall surface whereby the mold chamber remains hermetically sealed.

According to a particularly preferred aspect of the present invention, there is provided an additionally improved mold design which virtually eliminates all the sticking problems which maya be encountered in the practice of cracker production, even in such unfavorable situations where the cracker thickness is rather thin and/or where the employed grains or granular mixtures may readily cause an undesirably increased adherence of the pressure-baked and expanded cake to the mold cavity. In this connection extensive tests with different cereals had revealed severest sticking problems generally occur at the inner rim and edges of the baking mold. Hence it was concluded that the establishment of an appropriate relative movement between the cake rim and the periferal side wall of the baking mold, preferably at a time when the just expanded cake was still tightly held between upper and lower mold plate, could solve the sticking problem without deteriorating to any extent the cake structure and shape.

Accordingly the present invention also provides a remarkably improved baking mold of a novel design, consisting essentially of a fixed, heatable upper mold plate, a movable heatable lower mold (punch) adapted to be moved up and down relative to said upper mold (as described hereinbefore) and a periferal mold element cooperating with said upper and lower molds, suited to be selectively moved up and down and to receive said lower mold in a fluid-tight manner when the latter is moved upwards. The periferal mold member has separate means controlling the desired motion thereof, independently from the movable lower mold. The novel three-part mold thus defines a heatable, hermetically closed chamber for compressing and heating therein a granular raw material, when the periferal mold is slidably pressed in an air-tight manner against the fixed upper mold and the lower mold is slidably entered and lifted in said periferal mold. In fact the periferal mold can be considered as forming a movable side wall of a fixed upper mold with mold cavity as described hereinabove. A further important feature of the novel mold is that the lower mold head is of a sufficient height so that the upper surface of the periferal mold, when the latter is moved downwards and to its bottom position and received around the lower mold is substantially level with or below the upper side of the lower mold to allow an unhindered discharge of the expanded cake of the lower mold head.

When comparing the process steps for obtaining a cracker by means of the novel three-part mold as opposed to a two-part mold as described hereinabove, the main difference resides in the fact that after moving back the lower mold to its expansion position, the periferal mold is slided downwards over the perifery of the lower mold (instead of drawing back the lower mold) until its top is level with or below the top of the lower mold. At this stage the lower mold (carrying the ring mold) can, if needed, be moved further downwards as a function of the required feeding opening.

According to a very advantageous process variant the lower mold is quickly moved to a small extent below the top of the periferal mold just before feeding the granular material (in fact before the cake is completely pushed of the mold head). In this way a feeding reservoir of a small height is formed between the punch head and the top of the periferal mold, which has the particular advantage that none of the supplied grains (otherwise fed onto a flat surface with risk of spoiling) can fall of the mold head and hence the quantity of compressed grain material or the cake weight are always constant. After feeding the grain material the periferal mold ring is instantaneously raised and pressed against the upper mold before the lower mold starts its compression step.

The novel mold configuration is very beneficial in that cake weight, structure and shape are consistently uniform and free of rim defects.

Moreover, thinner cakes can now be produced without risk of sticking that normally would be desastrous with conventional apparatuses. A preferred measure to produce thin cakes is to cause the lower mold to carry out a desired slight upward movement after expansion but before pushing down the periferal mold.

Accordingly the expanded cake is pressure-formed into a required smaller thickness.

An additional unexpected advantage associated with the utilisation of the above described improved mold design is the fact that the production cycle time per cake can be shortened, which is attributed to the smaller distance over which the lower mold or punch has to be displaced. This factor of course, furnished a direct, extra-positive contribution to the already increased productivity resulting from the improvements provided by the present invention.

For a clearer understanding of the invention and to show how the novel apparatus and method for producing grain slices of desired form and composition, may be put into effect, reference will now be made, by way of example only, to the accompanying drawings in which.

Figure 3:
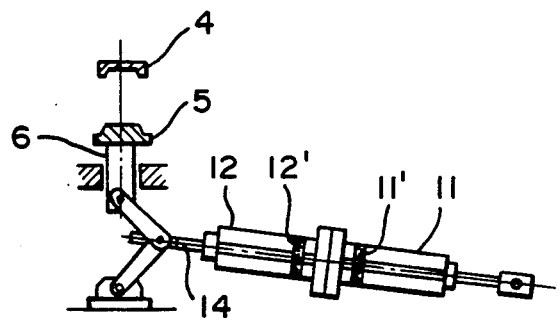
Figure 3:
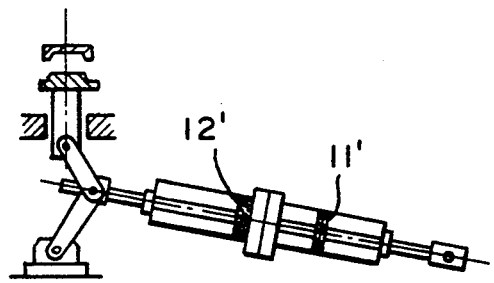
Figure 3:
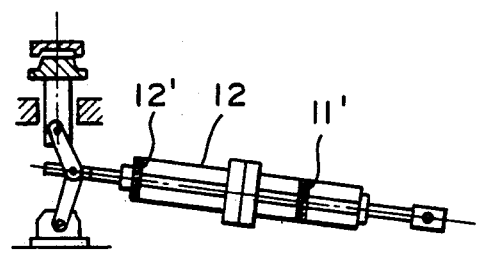
Figure 3:
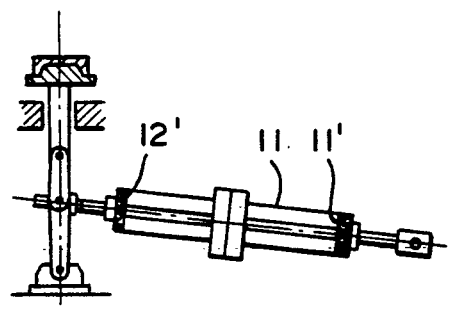
Figure 3:
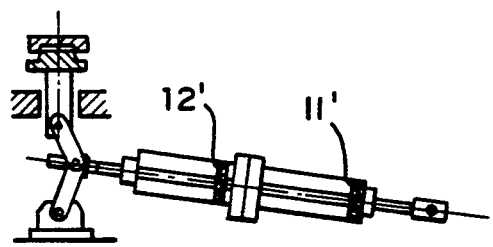

FIGS. 3.0–3.4 illustrate various positions of the pistons of the hydraulic cylinders during a cake production cycle.

Figure 4:
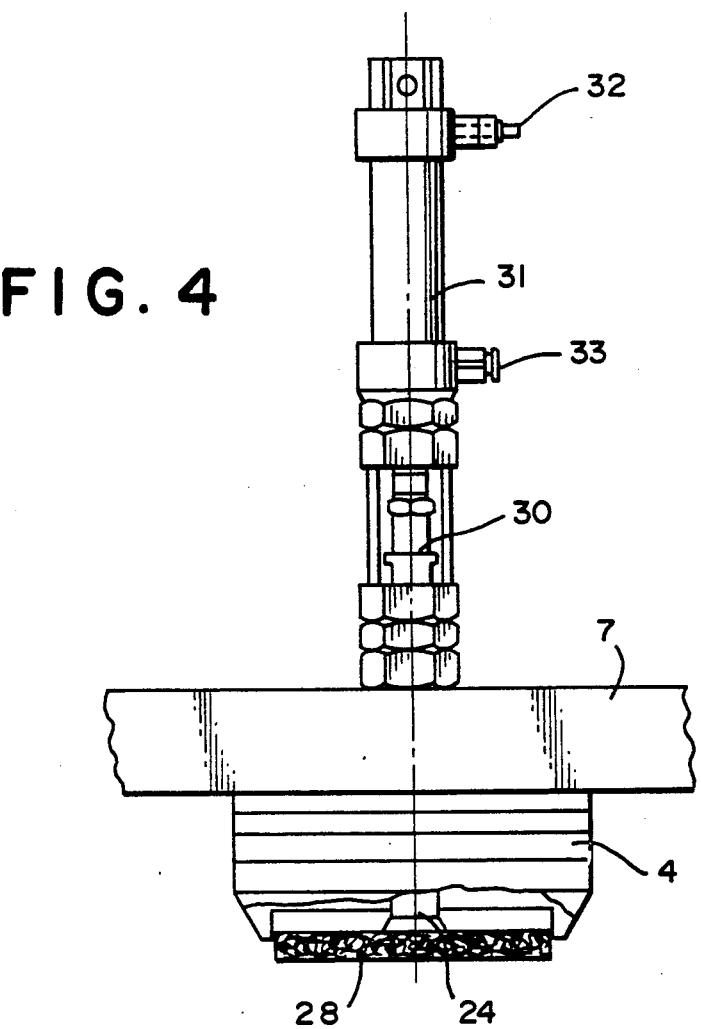

FIG. 4 gives a view of a pneumatically actuated push element of the fixed upper mold.

Figure 5:
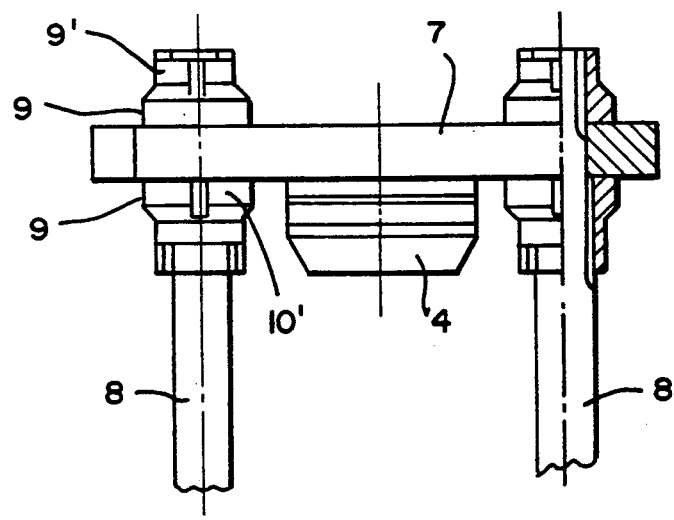

FIG. 5 shows a regulable support of a fixed upper mold.

Figure 6:
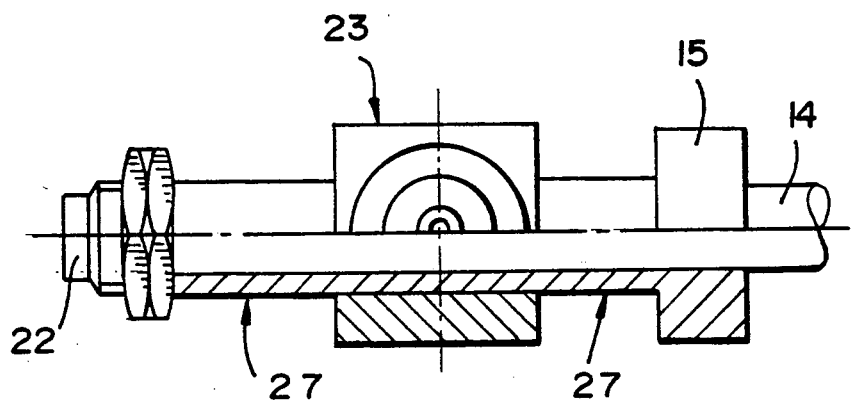

FIG. 6 illustrates a reinforcing sleeve of to the hydraulic shaft.

Figure 7:
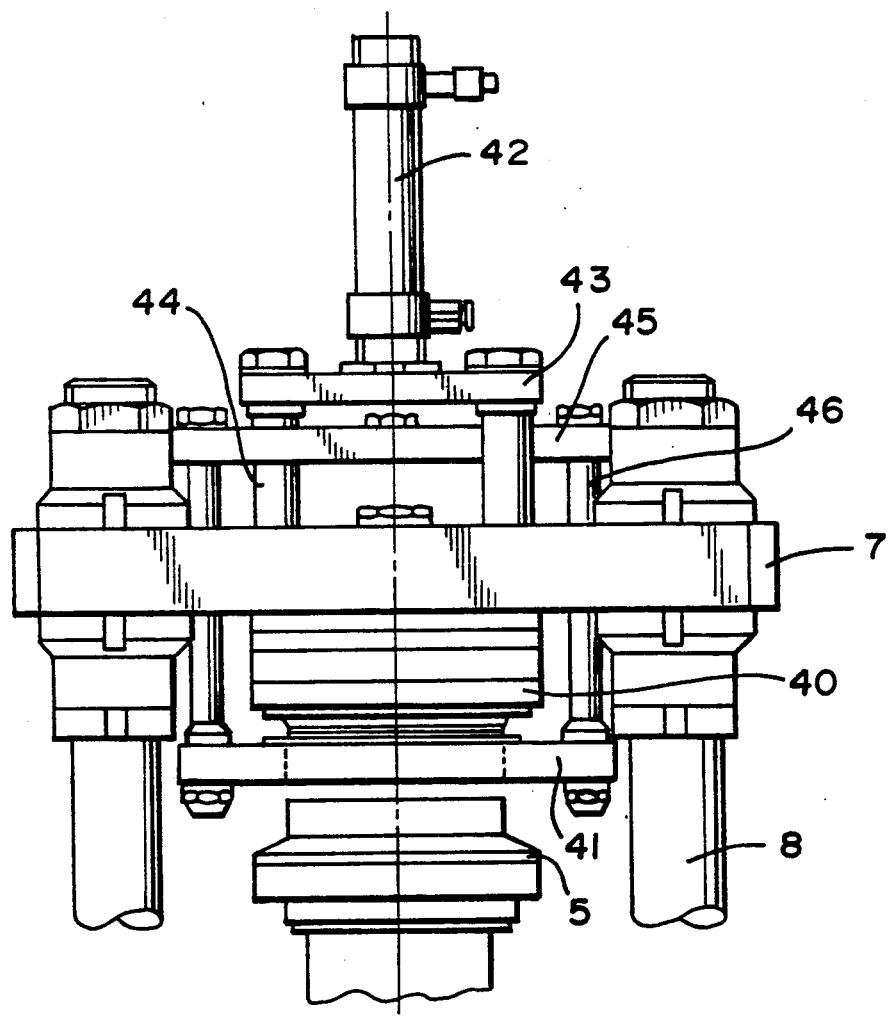

FIG. 7 is a view of a three-part mold arrangement with movable periferal mold element.

FIGS. 8(a)–8(d) illustrate the sequence of steps involved in using a three-part mold of the present invention.

Figure 9:
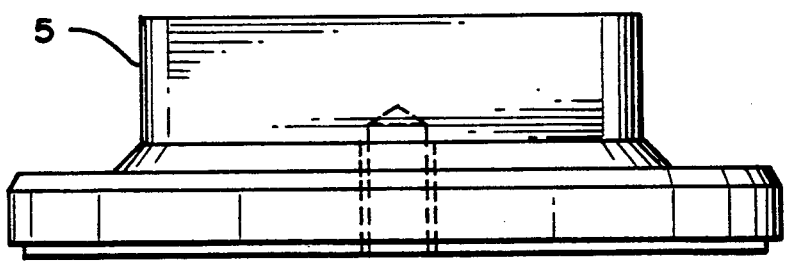

FIG. 9 is a side elevational view of a movable lower mold for making square-shaped cakes with rounded edges.

Figure 10:
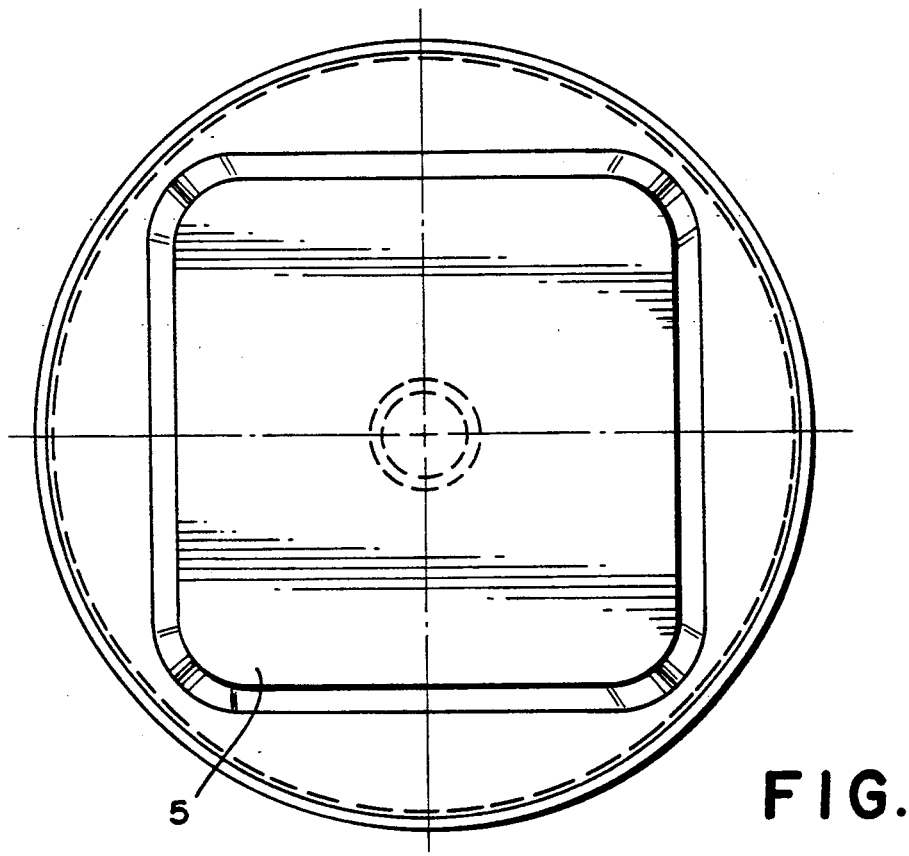

FIG. 10 is a top plan view of the mold shown in FIG. 9.

Figure 11:
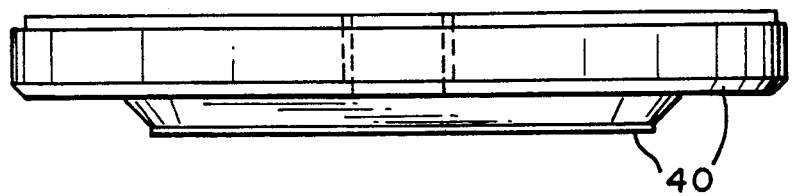

FIG. 11 is a side elevational view of the fixed upper mold used in connection with the lower mold shown in FIGS. 9-10.

Figure 12:
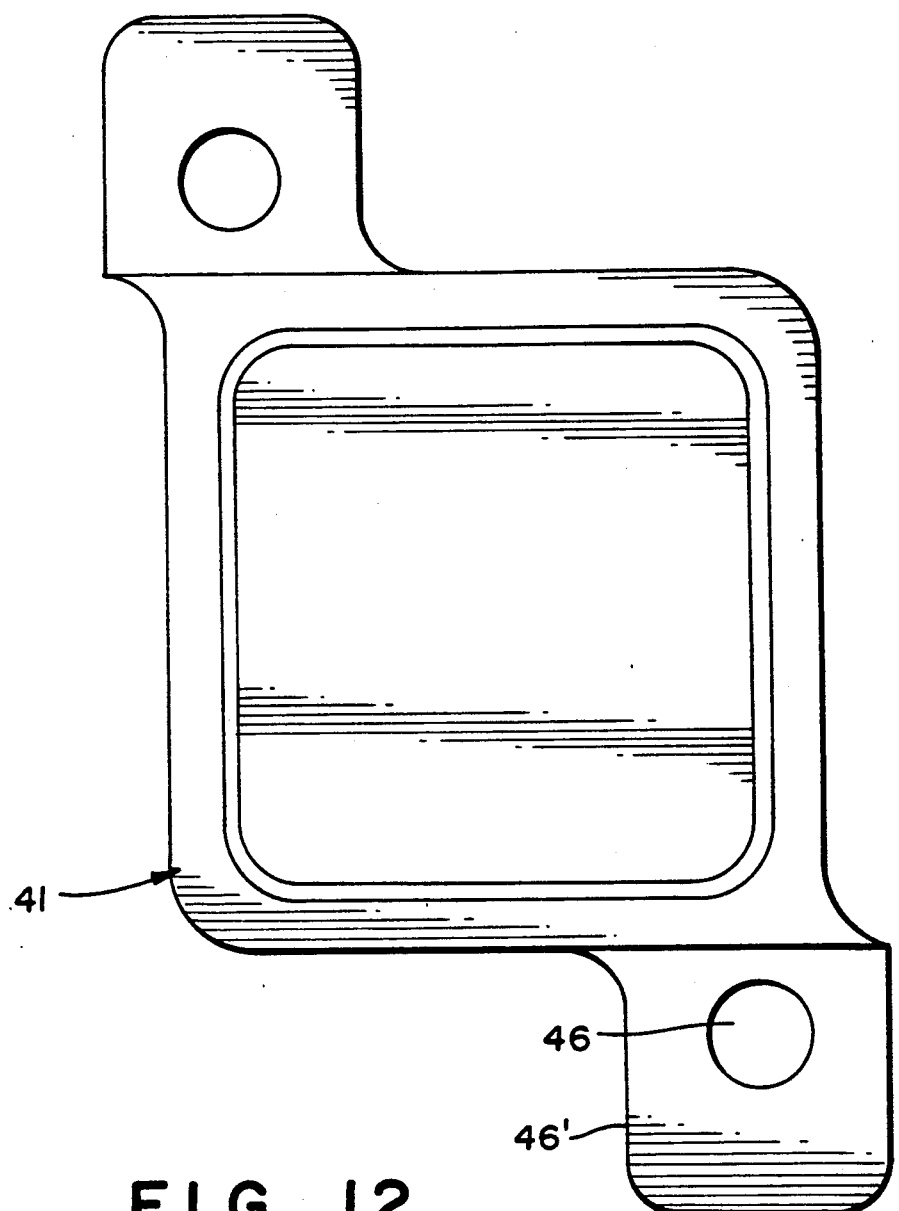

FIG. 12 is a top plan view of a square peripheral mold ring for cooperating with the upper and lower molds shown in FIGS. 9-11.

Figure 13:
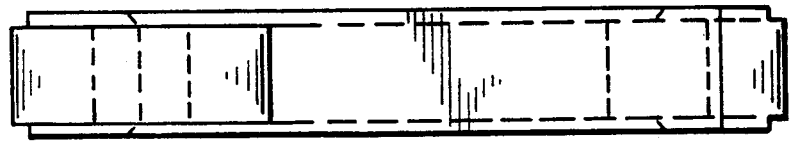

FIG. 13 is a vertical sectional view of the mold ring shown in FIG. 12.

FIG. 14 is a top plan view of a circular peripheral mold.

FIG. 15 is a vertical sectional view of the mold shown in FIG. 14.

FIG. 16 is a side elevational view of the movable lower mold for cooperating with the mold shown in FIGS. 14 and 15.

Figure 1:
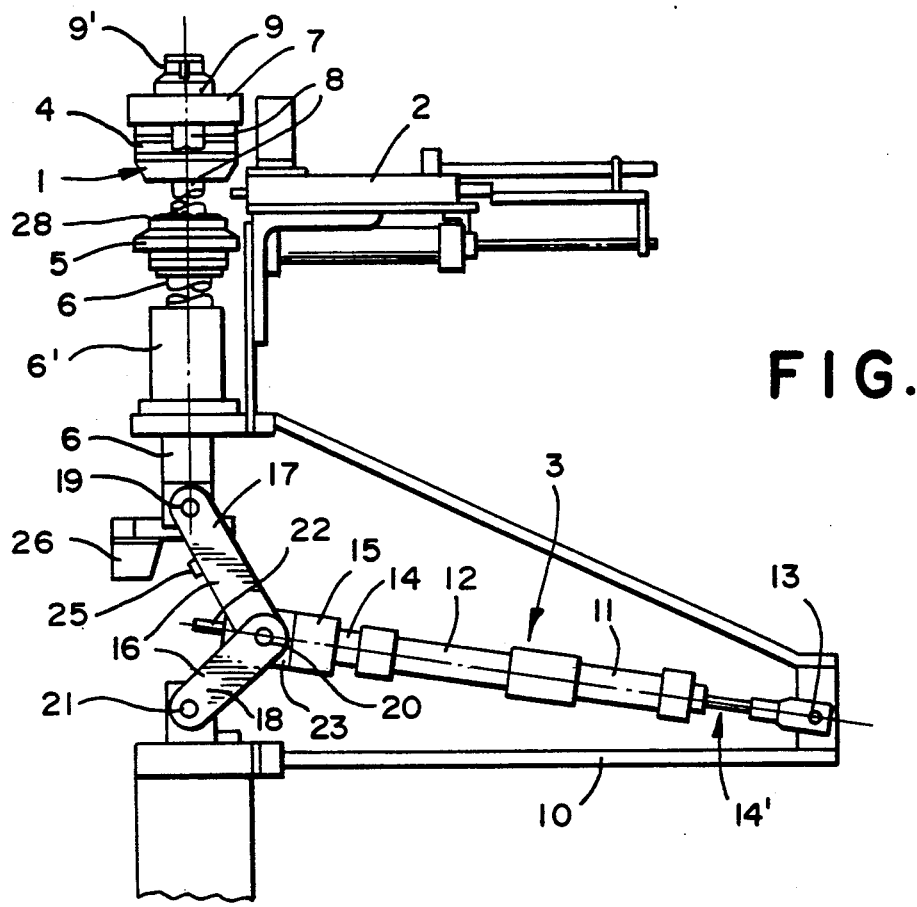
FIG. 1 is a side view of a cake making apparatus according to the invention.

Referring to FIG. 1, a baking mold 1, a feeding device 2 and a drive system 3 for said baking mold are mounted in a rigid apparatus frame or enclosure 10. The baking mold 1 comprises on the one hand a heatable fixed upper mold 4, in the form of a hollow die which is fixedly mounted in a robust upper mold plate 7 attached to the apparatus frame, whereby the die 4 is adjustable in height by means of screw elements 9 and 9' of the die guiding and supporting shafts 8. On the other hand there is provided a movable heatable lower die 5 in the form of a punch which is slidable up and down relative to the hollow die, and into and out of the mold cavity thereof so as to heat and compress a granular mass 28 supplied by feeding device 2 onto the punch head. The shaft 6 of the punch is slidably guided by guide means 6' fixed to the apparatus frame. At its lower 19 end the punch shaft 6 is rotatably connected to a transmission member 16 which is in the form of a two-arm joint having an upper arm 17 rotatably connected at 19 to the movable punch shaft 6 and a lower arm 18 swingably connected to a fixed rod element 21 of the apparatus frame, around which rod said lower arm rotates when the hinged connection 20 of said area is actuated by drive shaft 14 of the hydraulic drive system 3. Said drive consists of two separately controlled hydraulic cylinders 11 and 12, fixedly arranged in line back to back. The driving shaft 14 forms part of the hydraulic cylinder 12 by which it is directly actuated. The other hydraulic drive cylinder 11 is adapted to drive the whole assembly body formed of both cylinders. At the left side the hydraulic drive system is connected via the drive shaft 14 of cylinder 12 to transmission member 16, whereby the end position 22 of said shaft 14 may be slidably connected through body 23 of the hinged joint 20 of arms 17 and 18, or may be fixedly attached thereto. Push block 15 of drive shaft 14 presses against joint block 23 of the two hinged arms so that the two-arm transmission is lifted towards its vertical position when the hydraulic drive shaft 14 is displaced to the left, whereby at the same time the punch 5 is slided upwards. At the right side of the hydraulic drive system there is provided a shaft 14' fixedly mounted into the right end portion of the hydraulic assembly and rotably connected to a shaft member 13 of the apparatus frame, so that the assembly is fully supported and adapted to swing around member 13 (so as to compensate for the small angular displacements caused by the up and down movement of joint 20).

When the punch is raised by hydraulically pushing transmission member 20 towards a near vertical alignment of arms 17 and 18, the end of the compression stroke, i.e. the top position of the punch inside the die cavity 24 of upper mold 4, is defined by end switch elements 25 and 26, which stop the hydraulic drive.

Figure 2:
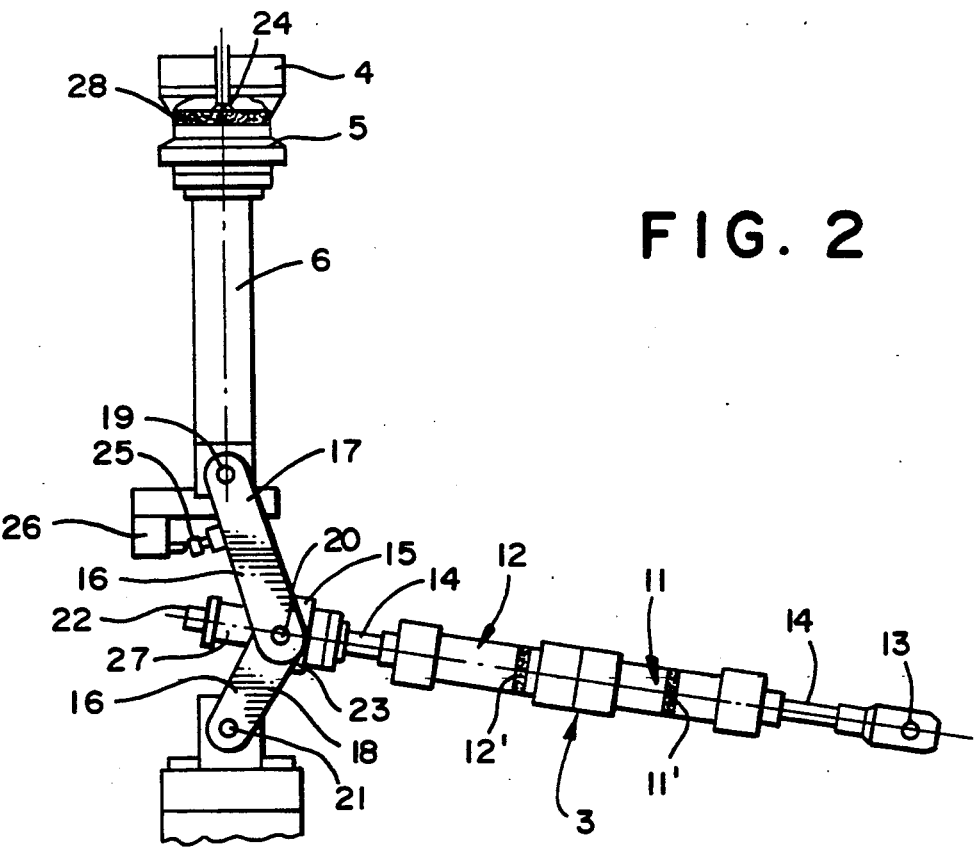
FIG. 2 shows a preferred embodiment of a drive means in an apparatus of the invention.

The particular drive system arrangement and the functional positions it has to assume according to the invention is explained into more detail by referring to FIGS. 2 and 3.

The back-to-back mounted hydraulic cylinders 11 and 12 have working pistons 11' and 12' which are adapted to cooperate in opposite directions: when piston 11' is moved to the right the hydraulic drive assembly including hydraulic cylinder 12 and drive shaft 14 is moved to the left and vice versa, whereas piston 12' directly actuating shaft 14 will displace shaft 14 to the left when itself is displaced in the left direction.

More in particular FIG. 3 illustrate the basic positions of the hydraulic pistons and their function as a constructional element of the apparatus according to the invention. These consecutively established positions correspond also with the subsequent steps of a cake production carried out on said apparatus and provide a method in accordance with the present invention. Accordingly there is shown in FIG. 3 a first position (3.0) wherein the pistons are nearly back-to-back at the starting point of their displacement stroke and which corresponds to a so called alarm stop whereby the punch and two-arm transmission are entirely drawn back to their lowest possible position (for example in case of maintenance, production interruptions). Picture 3.1 is in fact the rear starting (feeding) and end position (cake discharge) of a cake production cycle in practise. Here piston 11' has been moved for a given extent to the right, which defines a fixed starting and return point for said piston in a drive cycle for cake production. In position 3.1 the punch is out of and below the mold for a distance sufficient to allow the supply of a predetermined quantity of granular material from feeding device 2 (cf. FIG. 1) onto the punch surface. Said device is a known per se slidable feeding plate arrangement having suitable drive means and incorporated therein a cake discharge pushing element (not shown).

After feeding (step 1, picture 3.1) the piston 12' of cylinder 12 is moved from its fixed starting point to a predetermined end point which is regulable (according to the required expansion), whereby the two-arm joint is raised and the punch slidably enters the mold cavity (picture 3.2). When piston 12' reaches the end point of its preset stroke length, piston 11' of cylinder 11 instantaneously and automatically comes in action and pushes the punch into its required top position in which the granular material is heated-compressed for a predetermined short time in the hermetically closed chamber defined between the punch head and the upper mold top wall. The end point of the compression slide of piston 11' is controlled by end switch elements 25 and 26 (see FIG. 2) provided on transmission member 16 and apparatus frame. In this way the optimum required near vertical, non-locked position of transmission arms 17 and 18 is consistently established together with consistently constant pressurizing conditions of the lifted punch (picture 3.3; step 2 of the process).

Thereafter piston 12' is quickly moved back to its fixed starting position in hydraulic cylinder 12 (whereas piston 11' still remains in its end position shown in picture 3.3). As a result of the removal of the counterpressure applied to the punch and connecting transmission member, the heated and compressed grains are caused to suddenly expand to a precise and constant thickness defined by the constant displacement length of piston 12', whereby the punch and transmission member are thrown back onto the pushing block 15 of the moved back hydraulic shaft 14 (see FIG. 2) and whereby the punch is still inside the mold cavity. In said expansion position (picture 3.4; step 3) defined by piston 12' the punch is held back for a short while (fraction of a second) to allow full expansion of the cake to a expanded self-sustaining structure. Subsequently piston 11' is moved back to its starting position shown in picture 3.1 whereby the punch is slided back to its bottom feeding position below the mold (step 4) wherein the expanded cake is discharged and the production cycle starts again.

According to the connecting arrangement between the hydraulic drive shaft and the transmission member, which may be either slidable (free return) or fixed (direct return with drawnback drive shaft), the downward back-sliding of the punch may occur slightly later than the returning drive shaft (to a variable degree as a function of the end switch adjustment defining the vertical end position of the hinged arms) or will occur simultaneously with the return movement of the drive shaft. In the former case the expansion may be of a more or less explosive character, whereas in the latter case the expansion is always of the soft mode.

As can be understood from the above described production cycle, the novel arrangement of hydraulic drive cylinders and control means are superior over existing systems in terms of effectiveness, reliability and efficiency in that it provide a simple, flexible and fast reacting drive system (easy to adjust and program) and at the same time a consistently uniform expansion means enabling an energy-saving reliable and high-rate production of constant-quality cakes in improved low-noise level working conditions.

It is also possible to utilise an improved drive and control means according to the invention without the arrangement of a transmission member between the punch and the hydraulic drive. In this case the two-cylinder hydraulic drive is directly arranged below and in line with the punch shaft, and the end switch is integrated into the hydraulic drive shaft.

Further improvements are exemplified in FIGS. 4 to 11 which exemplify specific embodiments of an apparatus in accordance with the present invention.

FIG. 4 illustrates an upper mold arrangement, the improvement wherein a pushing member 24 is integrated in the upper wall of the mold cavity of the fixed die 4. The connecting shaft 30 of said piston-shaped pusher 24 is guided through the die and fixed to the die plate 7 with fixture means 29. Shaft 30 is actuated by a double-acting pneumatic cylinder 31 with air supply conducts 32 and 33. The piston member 24 is pushed downward immediately after expansion. Hence, cake 28 is always correctly discharged from the baking mold, irrespective of occasional sticking which could otherwise lead to serious production troubles and waste of material.

FIG. 5 shows a preferred arrangement of an adjustable mounting of upper die 4 relative to the apparatus frame. Here the die is fixed to a solid mold supporting plate 7 which itself is slidably regulable in height by means of joint elements 9, 9' which allow to move mold plate 7 via its sliding connection with the fixed supporting rods 8. Said arrangement allows a more precise adaptation of the fixed upper mold as a function of changing production circumstances (e.g. to cope with different thermal dilatation with changed ambient temperatures, changed baking temperature, mechanical setting . . . ).

FIG. 6 give a schematic view of a reinforcement element suited to be fixed onto the end portion 22 of hydraulic shaft 14 which is slidably connected to the transmission member (not shown) via a bore of connection block 23. Said element is in the form of a detachable hard steel sleeve 27 surrounding said shaft end portion and having an appreciably larger diameter. Since sleeve 27 is detachably fixed to the shaft (at its one end onto push block 15 and at its opposite end by screw means) it can be readily replaced in case of excessive wear and other damage. This avoids the delicate and expensive replacement of the hydraulic drive shaft, which cannot be removed without dismounting the hydraulic system of which it is an integral component.

A particularly preferred embodiment of a novel mold according to the present invention, which is very advantageous for being used a baking mold in the production of pressure-baked and expanded grain cakes, is depicted in FIG. 7. Basically the novel mold, which is also suited for other applications than expanded grain cake production, consists of three cooperating and matching parts:

- a heatable, fixed upper mold 40 attached to an adjustable upper plate (supported by shafts 8 of the apparatus frame).
- a movable periferal mold 41 operated by separate actuating means 42, adapted to be moved up and down relative to said upper mold 40 whereby in its top position the periferal mold 41 is tightly pressed against the bottom side of upper mold 41 so as to form a mold cavity with open bottom (comparable to a hollow die 4 as shown in FIGS. 1 and 2 of which the annular side wall is movable).
- a heatable, movable lower mold 5 (a punch as shown in FIGS. 1 and 2) connected to suitable drive means not shown in FIG. 7, adapted to be slidably received within the mold cavity formed by the fixed upper mold and the periferal ring mold in its top position.

Most conveniently the periferal mold is fixedly suspended at the lower side of a vertically movable bridgeframe of which the horizontal upper bridge member 45 is attached to the bottom end of an operating shaft of actuating means 42, and the vertical supporting members 46 connected to bridge member 45 are slidably guided through suitable perforations arranged in the mold plate 7.

When the periferal mold is lifted by means 42 into its top position the upper annular surface thereof is tightly pressed against a corresponding matching annular portion of the upper mold bottom side thereby forming a mold cavity which is hermetically closed at the top and open at the bottom to receive the movable punch therein in a fluid-tight manner. Thus, when the punch is moved upwards it closes the bottom of the periferal mold and when further lifted inside the periferal mold (held in its top position), a hermetically closed mold chamber is formed wherein the grain material (supplied onto the punch when the latter is below the mold cavity) is heated and compressed. Thereafter the punch is first lowered to an intermediate (expansion) position within the mold cavity which is still closed, to allow the expansion of the compressed grain material. At this stage the periferal mold is actuated by means 42 (e.g. a double action pneumatic cylinder) and pushed downwards whereby the periferal ring slides over the head of the punch and is stopped in a bottom position wherein the upper surface of the periferal mold is substantially level with or below the top of the punch when the latter is moved back to its bottom (feeding/discharging) position, wherein the expanded grain cracker can be discharged without hindrance from the lowered periferal mold. Given the absence of sticking with the three-part mold, the apparatus of the invention allows a multiple mold arrangement (e.g. 5 molds) driven by one hydraulic system without risk of production troubles, hitherto unconceivable with a conventional mold and apparatus.

Figure 8A:
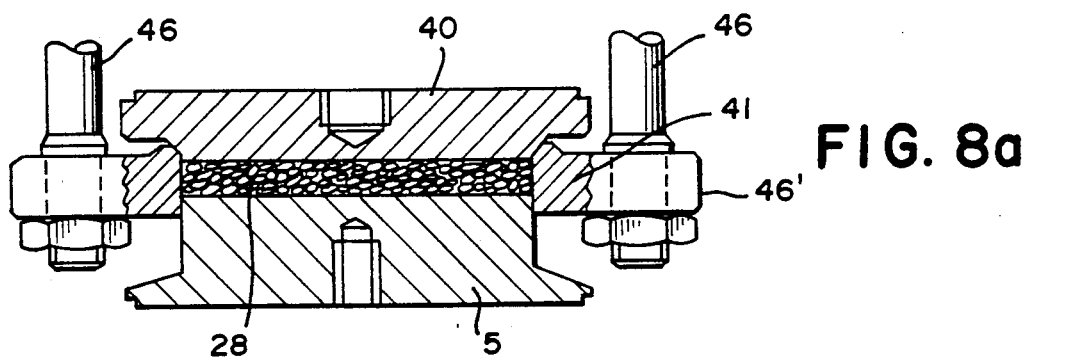
Figure 8B:
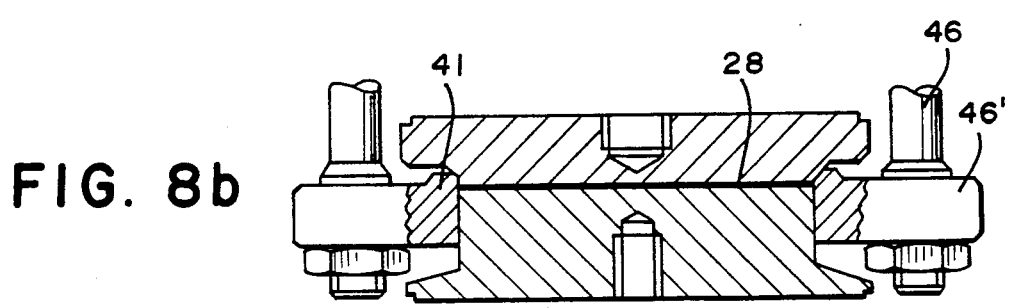

FIGS. 8a-b-c-d give a clearer understanding of the sequence of steps involved by using a three-part mold according to the invention. The drive means of the punch is preferably (but not necessarily) a two-cylinder hydraulic drive system as shown in FIGS. 1 to 2 and steps are more detailed in FIG. 3.

In FIG. 8a the punch 5 is already moved up to a position within the mold cavity defined in upper mold 40 and lifted periferal mold 41, and the compression of grain material 28 can start. In FIG. 8b the grain material is fully compressed and heated between the faces of upper and lower molds 40 and 5; punch 5 is held in its top position for a preset baking time.

Figure 8C:
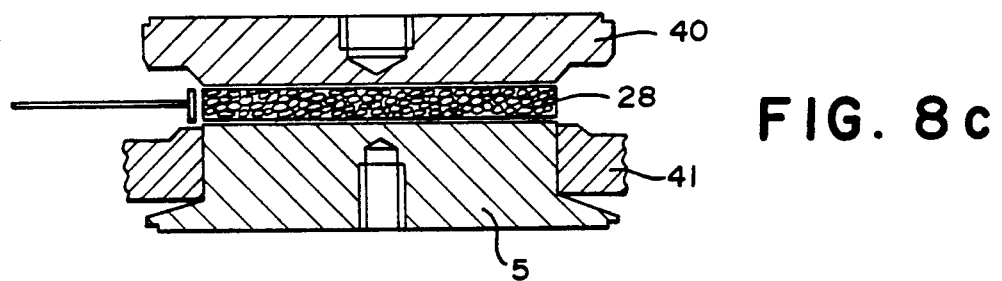
Figure 8D:
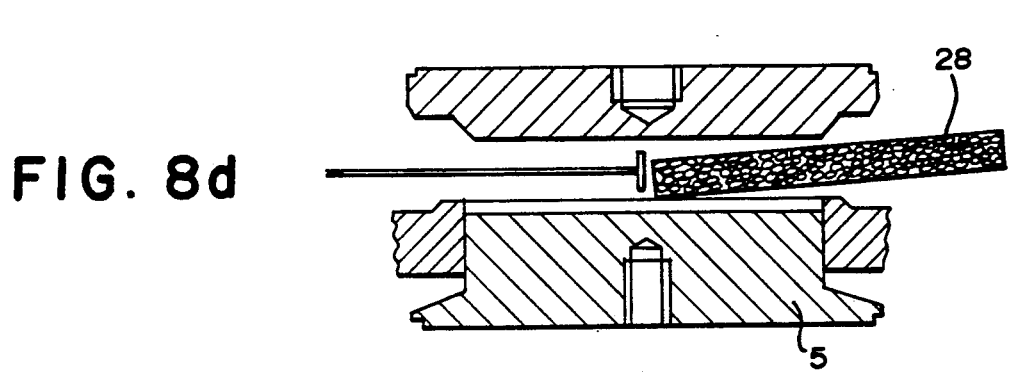

In FIG. 8c the periferal mold and the punch are in their bottom position, and a discharge element (schematically shown) of the feeding device is about to push the expanded cake off the punch surface, which is occuring in FIG. 8d. Here a further particular process feature is illustrated, which consists in lowering the punch to a small extent relative to the periferal ring so as to form a feeding cup in the punch head which avoids spoilage of grain material (otherwise occuring with a flat punch surface).

FIG. 8d furthermore shows that the punch can be lowered without risk even before the cake is completely discharged since the latter is already pushed over the side edge.

From FIGS. 8c and 8d it can also be derived that the novel mold arrangement with movable periferal mold enables to shorten the vertical distance between top and bottom position of the punch(i.e. the distance needed to enable an easy feeding and discharging operation by means of a slidable dosimeter whose sliding plate passes between upper and lower mold). Indeed, the available distance is decreased by an amount equal to the depth of the mold cavity since the periferal mold wall is here below feeding level. As a result the length of the up and down displacement of the punch is decreased and the necessary time for one cycle is likewise shortened. As a result the cake production rate is appreciably increased. This demonstrates that the new mold design with movable periferal mold element is surprisingly effective and advantageous in several aspects at the same time. A thus improved cracker making apparatus surpasses conventional apparatuses in productivity, machine reliability, energy efficiency and product quality. In addition the novel apparatus is universally applicable: it is not restricted to the usual rice cake production but can process any grain types and grain mixtures, inclusive those that give rise to sticking. Moreover, the production of thin expanded cakes no longer poses problems. A thin cake can be made either by decreasing the grain feed amount per cycle with adapted expansion position, or better by maintaining the process parameters as usual for a normal cake thickness, whereby after expansion the punch is shortly lifted in order to compress the expanded hot cake to a required smaller thickness and thereafter returning the periferal mold and the punch to their bottom position. This adapted punch cycle is simply effected by changing the program of hydraulic cylinder 12' (see FIG. 3) accordingly. It is worthwhile mentioning that the control of the movement of the actuating pistons of the hydraulic drive, and of the drive means for the feeding device and periferal mold, and further the timely sequence, and baking temperature, are all integrated in a central control and processing unit of the apparatus (not shown in the drawings). A change in production cycle is readily established by adapting the machine program, for instance by exchanging the standard program disk of the CPU-module by a suitable new one.

The apparatus of the present invention is suitable for any cake shape, provided the mold form is adapted accordingly (circular, square, rectangular, etc. . . . ). This applies also to the improved three-part mold. In this connection FIGS. 9a–b shows a mold for making square shaped cakes with rounded edges and FIG. 10 a circular mold. FIG. 9a illustrates how fixed upper and movable lower mold are designed whereby their equal compression surface is displayed in the middle. FIG. 9b illustrates a horizontal and vertical section of a square periferal mold ring cooperating with the upper and lower mold shown in FIG. 9a. FIG. 10 illustrates an embodiment of circular periferal mold. The two ears at the external perifery of the ring mold are fixture means to attach the periferal mold to the movable suspension-bridge.

Of course the fixed upper mold of the three-part mold can be provided with a pushing member as displayed in FIG. 4. If desired the ring mold may also be adapted to be heated by suitable electrical resistance element just like the upper and lower molds.

Though this specification has been written with reference to food products such as expanded cakes from granular raw materials (rice, etc.) other shaped products from other substances and other feed stocks (e.g. pastes, powders, chips, etc., . . . ) are feasible in like manner with the apparatus of the invention.

Other modifications to the apparatus and the three part-mold, inclusive to the method of fabrication described will be apparent to those skilled in the art, all falling within the scope of the invention described hereinabove and defined in the following claims.

I claim:

1. An apparatus for producing pressure-baked cake-like products from a granular cereal material, comprising:
   a) heatable mold means defining therein a cavity for baking a predetermined quantity of a raw material;
   b) said mold means having open, closed, and expansion positions;
   c) heatable punch means in selective cooperative engagement with said mold means for applying a pressure to the raw material;
   d) means for driving said punch means selectively in and out of said mold cavity for causing said mold means to assume one of said open, closed, or expansion positions;
   e) means for feeding granular material cooperating with said mold means;
   f) said driving means comprising an integral drive unit having cooperating first and second jack means;
   g) said first jack means for selectively driving said punch means in and out of said mold cavity for said mold means to assume either said open position or said closed position; and
   h) said second jack means for partially driving said punch means out of said mold cavity for said mold means to assume said expansion position.

2. The apparatus of claim 1, wherein:
   a) said drive unit is operably connected to said punch means by a two-arm transmission member.

3. The apparatus of claim 1, wherein:
   a) said drive unit includes a single drive shaft operably connected to said punch means;
   b) each of said first and second jack means comprises a hydraulic jack; and
   c) said first and second jacks are positioned back-to-back and selectively actuate said single drive shaft.

4. The apparatus of claim 3, wherein:
   a) said first and second jacks include first and second double-action pistons, respectively; and
   b) said first piston selectively drives said drive shaft as well as said second jack.

5. The apparatus of claim 4, wherein:
   a) said second piston selectively drives said drive shaft.

6. The apparatus of claim 5, wherein:
   a) said second piston includes means for driving said drive shaft in a direction same as the direction of movement of said second piston.

7. The apparatus of claim 4, wherein:
   a) said first piston includes means for driving said drive shaft in a direction opposite to the direction of movement of said first piston.

8. The apparatus of claim 4, wherein:
   a) said second piston has an adjustable stroke length; and
   b) said stroke length defines the expansion thickness of the product when the raw material is allowed to expand after having been pressure-baked in said mold means.

9. The apparatus of claim 1, and including:
   a) switch means for controlling the movement of said first jack means.

10. The apparatus of claim 1, and including:
    a) means cooperating with said mold means for releasing the baked products therefrom.

11. The apparatus of claim 3, and including:
    a) reinforcement sleeve means detachably mounted to said drive shaft and surrounding an end portion thereof.

12. The apparatus of claim 1, wherein:
    a) said mold means includes a first fixed mold member having a surface and a second generally annular mold member movable relative to said first mold member and defining a recess therethrough;
    b) said second mold member forms said mold cavity when moved to be in tight engagement with the surface of said first mold member; and
    c) means for moving said second mold member.

13. The apparatus of claim 1, wherein:
    a) said mold means assumes said closed position when said punch means is within said mold cavity; and
    b) said mold means assumes said open position when said punch means is completely withdrawn from said mold cavity.

14. The apparatus of claim 12, wherein:
    a) said mold means assumes said open position when said second mold member is withdrawn a preset distance from the surface of said first mold member.

15. A process for producing pressure-baked cake-like products from a raw granular cereal material, comprising the steps of:
    a) providing a baking device comprising:
       i) heatable mold means having a cavity for baking a predetermined quantity of the raw material and capable of assuming open, closed, or expansion positions;
       ii) heatable punch means selectively movable in and out of said mold cavity for applying a pressure to the raw material;

iii) first jack means for selectively driving said punch means in and out of said mold cavity for causing said mold means to assume said open or closed position; and iv) second jack means for partially driving said punch means out of said mold cavity for causing said mold means to assume said expansion position;

b) feeding a predetermined quantity of the raw material to the baking device;

c) closing said mold means by actuating said first jack means thereby moving said punch means in said mold cavity;

d) heating and compressing the raw material for a preset time period in said mold cavity;

e) causing said mold means to assume said expansion position by actuating said second jack means thereby partially withdrawing said punch means from said mold cavity;

f) allowing the heated and compressed raw material obtained in step d) to expand for a preset time period to form a cake-like product;

g) opening said mold means by actuating said first jack means thereby withdrawing said punch means from said mold cavity; and h) removing the pressure-baked cake-like product from between said mold means and said punch means.

16. The process of claim 15, including the step of:

a) compressing again for a predetermined time period the expanded cake-like product obtained in step (f) by driving said punch means again in said mold cavity.

17. The process of claim 15, wherein:

a) said feeding step is carried out by placing the raw material on said punch means.

18. A process for producing pressure-baked cake-like products from a raw granular cereal material, comprising the steps of:

a) providing a baking device comprising:
i) heatable mold means having a cavity for baking a predetermined quantity of the raw material;
ii) heatable punch means selectively movable in and out of said mold cavity for applying a pressure to the raw material;
iii) said mold means including a first fixed mold member having a surface and a second generally annular mold member movable relative to said first member; and
a) said second mold member of said mold means forming said mold cavity when moved to be in tight engagement with the surface of said first mold member;

b) feeding a predetermined quantity of the raw material to the baking device;

c) moving said punch means in said mold cavity;

d) heating and compressing the raw material for a preset time period in said mold cavity;

e) partially withdrawing said punch means from said mold cavity;

f) allowing the heated and compressed raw material obtained in step d) to expand for a preset time period to form a cake-like product;

g) opening said mold cavity for removing the pressure-baked cake-like product therefrom.

19. The process of claim 18, wherein:

a) said mold cavity opening step is carried out by withdrawing said second mold member a preset distance from the surface of said first mold member.

20. The process of claim 18, wherein:

a) said feeding step if carried out by placing the raw material on said punch means.

21. The process of claim 18, wherein:

a) said feeding step if carried out by:
i) withdrawing said second mold member a preset distance from the surface of said first mold member;
ii) moving said punch means partially into said second mold member so as to form a receiving chamber having the bottom defined by said punch means and the walls thereof defined by the inside wall of said second mold member, said receiving chamber being open at the top;
iii) feeding the granular material into said receiving chamber; and
iv) moving said second mold member so as to be in tight engagement with the surface of said first mold member.

22. The apparatus of claim 1, and including:

a) a plurality of said mold means in cooperation with a plurality of said punch means.

23. The apparatus of claim 1, and including:

a) control means for monitoring and adjusting the temperature of said mold means, operation of said feeding means, and the operation of said first and second jack means.

24. A three-part mold for pressure-shaping or pressure-baking articles from a raw granular cereal material, comprising:

a) a heatable, fixed upper mold plate;
b) a movable peripheral mold element;
c) a heatable movable punch element to be received within said peripheral mold element in a fluidtight manner;
d) said mold plate, said mold element and said punch element cooperate vertically with each other to form a hermetically closed mold cavity for compressing and heating therein a granular material into a pressed product of a predetermined shape which is readily removable from the mold cavity;
e) a bridge frame affixed to said upper mold plate and comprising two opposed guiding bars for slidably receiving therearound diametrically opposed bores in correspondingly disposed lateral lips formed at the edges of said peripheral mold element;
f) hydraulic drive means for moving said punch element upwardly and downwardly; and
g) means for controlling the motion of said peripheral mold element wherein the peripheral mold element is slidable up and down along said bridge frame.

* * * * *